E. Campbell,
Shoemakers' Tool,
No. 32,230.   Patented Apr. 30, 1861.
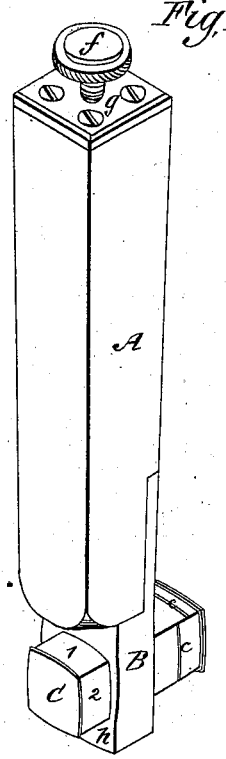
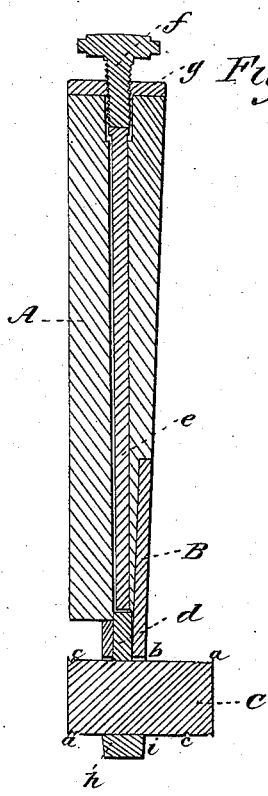
Witnesses.
Thos. R. Roach.
P. E. Teschemacher
Inventor.
Edwin Campbell
by his Attorney
Sam. Cooper

UNITED STATES PATENT OFFICE.

EDWIN CAMPBELL, OF BATH, MAINE, ASSIGNOR TO WM. HEATH, OF SAME PLACE.

EDGE-KEY.

Specification of Letters Patent No. 32,230, dated April 30, 1861.

*To all whom it may concern:*

Be it known that I, EDWIN CAMPBELL, of Bath, in the county of Sagadahoc and State of Maine, have invented an Improved Edge-Key, of which the following is a full, clear, and exact description, reference being had to the accompanying drawings, making part of this specification, in which—

Figure 1. is a view of my improved edge key. Fig. 2. a section through the same.

The object of my present invention is to make an "edge key" for finishing and smoothing the edge of boot and shoe soles, which may be readily adjusted by the operator to suit soles of any thickness, and may also combine in one tool a variety of patterns, and my invention consists in forming the "key" of a metal block adjustable in a shank or holder as I will now proceed to describe in such a manner that others skilled in the art may understand and use my invention.

In the said drawings A is a handle of wood, to the lower end of which is attached a metal shank B having a hole $b$ formed in it of a proper size to receive the block C; this block which is four sided and of a sufficient length to give the required adjustment, has an overlapping edge or lip at $a$ and has its faces 1, 2, 3, and 4 of a contour suited to give the required shape to the edge of the sole (for example grooves may be formed across the face of the block as at $c$ which will make ribs on the edge of the sole).

The block C is held in position after being adjusted in the shank B in the following manner: A small metal block $d$ which slides in a recess in the shank B, is pressed against the block C by a rod $e$ extending lengthwise through the handle, which rod is itself forced down by a thumb screw $f$ working in a cap $g$ on the end of the handle (or the screwrod and block $d$ may be in one). The end of the shank B below the block C is beveled off at $h$ where it rests on the bottom of the sole of the boot, when the key is being used, (that is being rubbed back and forth with one of the faces of the block C against the edge of the sole).

When the key is to be used for a sole of a different thickness it is only necessary to loosen the screw $f$ and slide the block C through the hole $b$ until the distance from the edge or lip $a$ and the shank B at $h$ suits the thickness of the sole, when the screw $f$ is again tightened up. As either face of the block C may be turned toward the end $h$ of the shank B or the block turned end for end, a great variety of patterns may be obtained with one tool as the grooves $c$ on each face may be of different sizes and forms and at different distances from the edges $a$.

The face of the shank B at $i$ is made straight or any bevel different from that at $h$ may be given to it, to suit the bevel required on the edge of the sole.

What I claim as my invention and desire to secure by Letters Patent as an improved article of manufacture, is—

A boot and shoe "edge key," in which the parts are constructed and combined to operate in relation to each other as shown and described.

EDWIN CAMPBELL.

Witnesses:
   D. F. BAKER,
   GEO. W. TUCKER.